Dec. 20, 1960    J. L. JENSEN    2,965,833
SEMICONDUCTOR VOLTAGE REGULATOR APPARATUS
Filed March 10, 1958
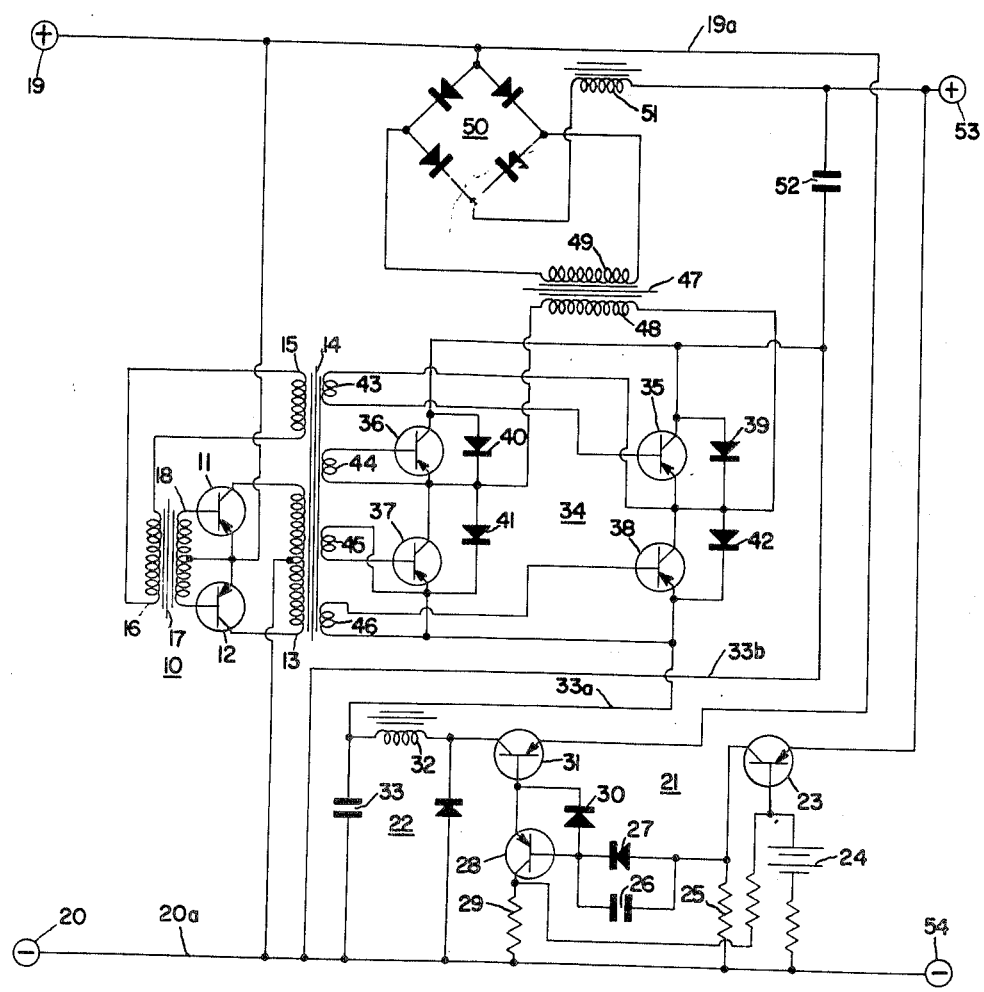
INVENTOR.
JAMES LEE JENSEN
BY  Omund R. Dahle
ATTORNEY

United States Patent Office 2,965,833
Patented Dec. 20, 1960

2,965,833

SEMICONDUCTOR VOLTAGE REGULATOR APPARATUS

James Lee Jensen, St. Louis Park, Minn., assignor to Minneapolis-Honeywell Regulator Company, Minneapolis, Minn., a corporation of Delaware Filed Mar. 10, 1958, Ser. No. 720,440

15 Claims. (Cl. 323—45)

This invention relates generally to electronic voltage regulation apparatus utilizing semiconductor apparatus and more particularly to electronic voltage regulation apparatus using a direct current voltage booster circuit.

In many applications it is desired to maintain a direct current output voltage to a load at a constant value. A number of methods have been proposed to maintain the output voltage constant with a varying input voltage. It is the purpose of this invention to provide new, novel and useful apparatus whereby the output voltage from an electronic regulator circuit utilizing semiconductor apparatus is maintained at a substantially constant value.

It is therefore the object of this invention to provide apparatus for supplying a substantially constant direct current output voltage from a direct current input voltage wherein the output voltage is maintained substantially constant by the use of semiconductor apparatus.

A further object of this invention is to provide apparatus to supply direct current power to a load wherein the output voltage to the load is maintained at a substantially constant value by means of a direct current voltage booster.

These and other objects of the present invention will be more clearly understood upon a consideration of the following specification, claims and drawing.

The single figure is a schematic diagram of a preferred embodiment of this invention.

Referring now to the figure, there is shown an oscillator 10 of the general type shown in my U.S. Patent 2,774,878 assigned to the same assignee as the present invention. The oscillator 10 comprises transistors 11 and 12 which are shown as PNP junction type transistors for convenience, the collectors of said transistors being interconnected by a center tapped primary winding 13 of oscillator output transformer 14. Secondary winding 15 of oscillator output transformer 14 is directly connected to primary winding 16 of a saturating feedback transformer 17. A center tapped secondary winding 18 of the saturating feedback transformer 17 interconnects the bases of transistors 11 and 12. The center tap of winding 18 is directly connected to the emitters of transistors 11 and 12. Input power to operate the oscillator 10 is applied between the emitters of transistors 11 and 12 and the center tap of winding 13 from power input terminals 19 and 20. Power input terminals 19 and 20 are connected to a direct current source of potential having a polarity as shown and that terminal 19 is positive with respect to terminal 20.

A form of control apparatus, shown as switching apparatus, generally designated 21 is operative to supply power to a filter generally designated 22. The combination of switching apparatus 21 and filter 22 effectively creates a variable source of power. The base electrode of transistor 23 is directly connected to a reference potential source 24. While the reference potential is shown as a battery, it is to be understood that other forms of reference potential may be utilized. Such may be, for example, a Zener diode. The collector electrode of transistor 23 is directly connected to a collector load resistor 25. A switching capacitor 26 in parallel with a diode 27 is directly connected between the collector electrode of transistor 23 and the base electrode of a transistor 28. A collector load resistor 29 connects the collector electrode of the transistor 28 to the common negative conductor 20a at a junction on conductor 20a. A diode 30 directly connects the base electrode of a transistor 31 to the base electrode of the transistor 28.

The variable source of power including a filter 22 comprises an inductor 32 directly connected to the collector electrode of transistor 31 and a capacitor 33 connected between the remainder terminal of inductor 32 and the common negative conductor 20a.

The output power from the filter 22 is supplied by means of conductors 33a and 33b to a bridge type amplifier 34 of the general type disclosed in my co-pending application Serial No. 619,003, filed October 29, 1956, and assigned to the same assignee as the present invention. Amplifier 34 includes transistors 35, 36, 37 and 38 and the associated diodes 39, 40, 41 and 42. Secondary winding 43 of oscillator output transformer 14 is directly connected between the emitter and base of transistor 35. Secondary winding 44 of oscillator output transformer 14 is directly connected between the emitter and base of transistor 36. The phase relation of the voltage applied between the emitter-base of transistor 35 is opposite to that of the phase relation of the voltage applied between the emitter-base of transistor 36. Secondary winding 45 of oscillator output transformer 14, having the same phase relation as that of winding 43 is directly connected between the emitter-base of transistor 37. Secondary winding 46 of oscillator output transformer 14, having the same phase relation as that of secondary winding 44 is directly connected between the emitter-base of transistor 38.

A booster transformer 47 has a primary winding 48 connected to the output terminals of bridge amplifier 34 and a secondary winding 49 directly connected to the input terminals of a bridge type rectifier 50. The first output terminal of bridge rectifier 50 is directly connected to the power input terminal 19 and the second output terminal of bridge rectifier 50 is directly connected to an inductor 51. The inductor 51 is further connected to a filter capacitor 52 and positive power output terminal 53. A load device, not shown, is directly connected between power output terminals 53 and 54.

Operation

In considering the operation of the embodiment of my invention shown in the figure, the operation of oscillator 10 will first be discussed. Assume that a direct current source of potential has been applied to power input terminals 19 and 20 having the polarity as shown. This source of potential is then applied between the emitters of transistors 11 and 12 and the center tap of winding 13. Oscillator 10 is operating continuously and with the input voltage as shown, assume that at a particular instant transistor 11 is conducting. Under this condition a direct current path may be traced from power input terminal 19, from the emitter to collector of transistor 11, through the upper section of winding 13, the center tap of winding 13, conductor 28 and power input terminal 20. The current flow through this path will induce in winding 15 a potential such that the upper terminal of winding 15 is positive with respect to the lower terminal. The voltage induced in winding 15 is impressed upon primary winding 16 of saturating feedback transformer 17 and induces in secondary winding 18 of saturating feedback transformer 17 a voltage of such polarity that base of transistor 11 is maintained at a negative potential with respect to the emitter of transistor 11 and the base of transistor 12 is maintained at a positive potential with respect to the emitter of transistor 12. Under this condition, transistor 11 is maintained in the conductive state and transistor 12 in the non-conductive state. This condition of operation will continue with transistor 11 conducting and transistor 12 non-conducting until such time that the core of transformer 17 has become saturated due to the feedback voltage impressed upon it from winding 15. Upon the saturation of the core of transformer 17, the polarity of the voltages induced in secondary winding 18 reverses, thus switching transistor 11 to a non-conductive state and transistor 12 to the conductive state. With transistor 12 conducting, a direct current path may be traced from the power input terminal 19, from the emitter to collector of transistor 12, through the lower portion of winding 13, the center tap of winding 13, conductor 20a, and power input terminal 20. The current flow through this path will induce a voltage in feedback winding 15 of such a polarity as to make the lower terminal of winding 15 positive with respect to the upper terminal. This feedback voltage is impressed upon primary winding 16 of saturating feedback transformer 17 and induces in secondary winding 18 a voltage of such polarity that transistor 11 is maintained in the non-conductive state and transistor 12 in the conductive state. This condition of operation continues until such time as transformer 17 becomes saturated in the reverse direction at which time the polarity of the voltage on secondary winding 18 reverses and the original state of operation is maintained. Thus it can be seen that the output from the oscillator 10 is a voltage of alternating polarity which induces in the secondary windings a source of alternating current potential. By proper design of the oscillator 10, it is possible to obtain in the secondary windings a voltage of substantially square wave form. This type of secondary voltage wave form is desirable in the operation of the bridge type amplifier 34 to be more fully described hereinafter.

The operation of the switching apparatus generally designated as numeral 21 may briefly be described in the following manner. If the output voltage exceeds a level determined by reference potential 29, the emitter of transistor 23 becomes positive with respect to the base of transistor 23 rendering the transistor 23 conductive. Collector current from transistor 23 places a positive potential on the upper lead of collector load resistor 25. With the positive potential on collector load resistor 25, the potential change applied through switching capacitor 26 drives the base electrode of transistor 28 positive with respect to its emitter and tends to inject current into the base of transistor 28 causing the transistor to cut off rapidly. This positive bias is also applied through diode 30 to the base electrode of transistor 31 to aid in a sharp cut off of transistor 31.

If the output potential across output terminals 53 and 54 decreases below the predetermined value set by reference potential source 24, the emitter of transistor 23 is negative with respect to its base. Transistor 23 therefore is cut off and the base electrode of transistor 28 is at a negative potential with respect to its emitter electrode. Transistor 28 therefore is conductive and causes a collector current to flow through collector load resistor 29. The conduction of transistor 28 in turn causes the conduction of transistor 31. With transistor 31 conducting, a current path may be traced from positive power input terminal 19, through conductor 19a, from the emitter to collector of transistor 31, through inductor 32, capacitor 33 to charge the capacitor, conductor 20a and thence to power input terminal 20. Thus it can be seen that the combination of switching apparatus 21 and filter 22 results in capacitor 33 acting as a variable potential type source. The magnitude of this potential is variable from zero to substantially that of the input voltage and is a function of the differential existing between the output voltage and the reference potential. In order words, the magnitude of the variable potential is a function of the ratio of on time to off time of the switching apparatus 21. While I have shown the control apparatus in the form of switching apparatus it is apparent to those skilled in the art that other forms of control apparatus are applicable to my invention.

The bridge type amplifier 34 is used in the present invention to convert the variable direct current potential appearing across capacitor 33 to an alternating current type voltage which is impressed upon transformer 47. The operation of amplifier 34 may be more clearly understood upon a consideration of the following description. The transistors 35, 36, 37 and 38 included in the amplifier 34 are selectively and alternately biased into either the conductive or non-conductive states. In the present invention, two transistors are conductive simultaneously and the remainder two transistors are not conductive. Diodes 39, 40, 41 and 42 serve the useful function of damping transient voltages which may arise in the circuit. Thus it can be seen that the diodes serve a useful function of protecting the amplifier transistors from the possible damage of high transient voltages.

During the time interval that transistor 11 of oscillator 10 is conductive, the voltage impressed upon secondary windings 43 and 45 of transformer 14 is of such polarity as to maintain transistors 35 and 37 in the conductive state. The polarity of the voltage impressed upon secondary windings 44 and 46 of transformer 14 is such as to prevent the conduction of transistors 36 and 38. That is to say, the emitter electrodes of transistors 35 and 37 are positive with respect to their respective base electrodes and the emitter electrodes of transistors 36 and 38 are negative with respect to their respective base electrodes. In view of the above explanation, it can be seen that with transistors 35 and 37 conducting, a current path may be traced from the positive or upper plate of capacitor 33 through the emitter to collector of transistor 37, primary winding 48 of transformer 47, the emitter to collector of transistor 35, and back to the negative or lower plate of capacitor 33.

Upon the cessation of conduction of transistor 11 and the initiation of conduction of transistor 12, the voltage output of the oscillator reverses and the potential induced in secondary windings 43 and 45 is of such polarity as to render transistors 35 and 37 non-conductive. That is to say, the base electrodes of transistors 35 and 37 are driven positive with respect to the emitter electrodes of transistors 35 and 37. During the same time interval the polarity of the voltage induced in windings 44 and 46 of transformer 14 is of such polarity as to bias transistors 36 and 38 in a conductive state. That is to say, the base electrodes of transistors 36 and 38 are driven negative with respect to the emitter electrodes of transistors 36 and 38. With transistors 36 and 38 conductive, a current path may be traced from the positive or upper plate of capacitor 33 through the emitter to collector of transistor 38, through primary winding 48 of transformer 47 in a direction opposite to that previously described, from the emitter to collector of transistor 36, and back to the negative or lower plate of capacitor 33. From the above description it can be seen that the output voltage from the oscillator 10 is utilized to alternately and oppositely switch the transistors of bridge type amplifier 34 from the non-conductive to the conductive state which action changes the variable direct current potential appearing across capacitor 33 to an alternating current type potential which is impressed upon primary winding 48 of transformer 47.

The alternating current type potential impressed on primary winding 48 of transformer 47 induces in secondary winding 49 of transformer 47 an alternating current type potential which is rectified by bridge rectifier 50. This rectified alternating current potential is added in series with the power input source between power input terminal 19 and the filter choke input conductor. The sum of the input potential and the rectified alternating current type potential is filtered by means of filter inductor 51 and filter capacitor 52 and is inserted between power input terminal 19 and power output terminal 53.

The overall operation of my invention may be described as follows: assume that the output potential appearing across power output terminals 53—54 exceeds that of a predetermined level. Under this condition the reference potential source 24 is exceeded and transistor 23 is in a conductive state. The conduction of transistor 23 places a positive potential on collector load resistor 25 which maintains transistors 28 and 31 in the non-conductive state as previously described in the explanation of the switching apparatus 21. With transistor 31 in the non-conductive state, no collector current may flow therefrom so that capacitor 33 has no voltage impressed upon it. With no voltage upon capacitor 33, there will be no power applied to bridge type amplifier 34 so that no alternating current type potential will be impressed upon primary winding 48 of transformer 47. Under these conditions a direct current path may be traced from power input terminal 19, through bridge type rectifier 50, inductor 51, the load device connected across power output terminals 53 and 54, conductor 20a and back through power input terminal 20. Thus it can be seen that when the output voltage exceeds that of a predetermined level, the voltage booster circuit does not add a potential between power input terminal 19 and power output terminal 53.

Now assume that the output potential appearing across power output terminals 53 and 54 decreases below that of a predetermined level determined by potential source 24. If the output voltage across power output terminals 53—54 is below the predetermined level, the emitter of transistor 23 is negative with respect to the base of transistor 23, the transistor will be cut off and there will be substantially no collector current from the transistor 23. With substantially no collector current from transistor 23, the voltage drop across resistor 25 is reduced and the base of transistor 28 is negative with respect to its emitter and transistor 28 is therefore in the conductive state. The conduction of transistor 28 causes transistor 31 to conduct and the collector current from transistor 31 begins to charge capacitor 33. The variable voltage appearing across capacitor 33 is impressed upon conductors 33a and 33b connected to bridge type amplifier 34. The variable direct current voltage appearing across capacitor 33 is amplified and converted to an alternating current type potential in a manner previously described. The alternating current type potential obtained from the bridge type amplifier is impressed upon primary winding 48 of transformer 47.

The alternating current type potential impressed upon primary winding 48 of transformer 47 induces a voltage in secondary winding 49 of transformer 47 of an alternating current type. This alternating current type voltage induced in the secondary winding 49 is impressed upon the input terminals of bridge type rectifier 50, is rectified by bridge rectifier 50 and the sum of the power input potential and the rectified alternating current type potential is filtered by means of filter inductor 51 and filter capacitor 52. This rectified alternating current potential is thereby converted to a direct current type potential which is of such polarity that it is added to the potential source impressed upon power input terminals 19 and 20. Thus it can be seen that when the output voltage appearing across power output terminals 53 and 54 decreases below a predetermined value the present invention operates in such a manner as to add a voltage of such polarity and magnitude to the input potential source to raise the output potential to the desired level.

Changes and modifications of this invention will undoubtedly occur to those skilled in the art and I therefore wish it to be understood that I intend to be limited only by the scope of the appended claims and not by the specific embodiment of my invention as disclosed herein for the purposes of illustration only.

I claim:

1. Potential regulating apparatus comprising; a pair of input terminals adapted to be connected to a direct current potential source; a pair of output terminals; potential comparison means, said potential comparison means adapted to compare the potential appearing at said output terminals with a reference potential to produce an output signal having a magnitude which is a function of the compared potentials; transformer means, said transformer means having input connections and output connections; potential booster means including rectifier means and output connections of said transformer means connected interjacent one of said input terminals and one of said output terminals; electrical potential inverter apparatus, said inverter apparatus being connected to and controlled by said comparison means output signal; and further means connecting said inverter apparatus output potential in circuit with said transformer input connections whereby said booster means is proportionately energized in response to said comparison means output signal.

2. Voltage regulating apparatus comprising; a pair of input terminals adapted to be connected to an unregulated direct current potential source; a pair of output terminals; voltage comparison means, said voltage comparison means adapted to compare the potential at said output terminals with a reference potential; transformer means, said transformer means including at least two windings; potential booster means including rectifier means and one winding of said transformer means connected interjacent one of said input terminals and one of said output terminals; electrical potential inverter apparatus, said inverter apparatus being energized in accordance with the output signal of said voltage comparison means and operative to energize the remainder transformer winding whereby said booster means is energized and is operative to add to the direct current potential source when the output voltage decreases below a predetermined level.

3. Voltage regulating apparatus comprising; a pair of input terminals adapted to be connected to a direct current potential source; a pair of output terminals; voltage comparison means, said voltage comparison means being connected to compare the potential at said output terminals to a reference potential; transformer means, said transformer means having input connections and output connections; potential booster means including rectifier means and the output connections of said transformer means connected interjacent one of said input terminals and one of said output terminals; electrical inverter apparatus, said inverter apparatus being energized in accordance with the output of said voltage comparison means and connected in energizing relation to said transformer input connections whereby said booster means is energized and is operative to aid the direct current potential source when said output potential decreases below a predetermined level.

4. Voltage regulating apparatus comprising; a pair of input terminals adapted to be connected to a direct current potential source; a pair of output terminals; alternating current potential producing means energized by and including signal producing output voltage comparison means, the magnitude of said alternating current potential being a function of the voltage appearing across said output terminals; transformer means, said transformer means having at least two windings; means connecting one of said transformer windings in circuit with the output of said means for producing an alternating current potential; rectifier means; means connecting said rectifier means interjacent one of said input terminals and one of said output terminals; and further means connecting said rectifier means in circuit with the remainder winding of said transformer means whereby said rectifier means is energized and produces a direct current potential which aids the direct current potential source when the output voltage decreases below a predetermined value.

5. Voltage regulating apparatus comprising; a pair of input terminals adapted to be connected to a variable direct current potential source; a pair of output terminals; alternating current potential producing means energized by and including signal producing input voltage comparison means, the magnitude of said alternating current potential being a function of the voltage appearing across said input terminals; transformer means, said transformer means having input connections and output connections; means connecting said transformer input connections in circuit with the output of said means for producing an alternating current potential; rectifier means, means connecting said rectifier means interjacent one of said input terminals and one of said output terminals; and further means connecting said rectifier means in circuit with said output connections of said transformer means whereby said rectifier means is energized and produces a direct current potential which aids the variable direct current potential source when the input voltage decreases below a predetermined value.

6. Voltage regulating apparatus comprising; a variable direct current potential source connected to a pair of power input terminals; output terminals; transformer means, said transformer means having at least a first and a second winding; means including bridge rectifier means and one of said transformer windings connecting one of said power input terminals to one of said output terminals; bridge amplifier means, the output of said bridge amplifier being connected to the remainder winding of said transformer means; oscillator means, the input terminals of said oscillator means being connected to and energized from said power input terminals, the output voltage of said oscillator connected in controlling relation to said amplifier means; output voltage responsive switching apparatus, said switching apparatus being connected interjacent said output terminals and operative to supply power to said amplifier means when the output voltage decreases below a predetermined value whereby said rectifier means produces a direct current potential which adds to the variable direct current potential source.

7. Voltage regulating apparatus comprising; a direct current potential source which may vary in magnitude connected to a pair of power input terminals; output terminals; transformer means, said transformer means having input connections and output connections; means including bridge rectifier means and said transformer output connections connecting one of said power input terminals to one of said output terminals; amplifier means, the output of said amplifier being connected to said input connections of said transformer means in energizing relation thereto; oscillator means, energized from said power input terminals, the output signal of said oscillator means connected in controlling relation to said amplifier means; voltage responsive switching apparatus including potential comparison means connected to sense the potential at said output terminals and operate said switching apparatus upon the sensed potential reaching a predetermined level, said switching apparatus being connected to said power input terminals and operative to supply power to said amplifier means when the output voltage decreases below said predetermined value whereby said rectifier means produces a direct current potential which adds to the direct current potential source to thereby increase the output potential.

8. In an electrical control circuit, the combination comprising a source of direct current having a substantially constant voltage for supplying current to a load circuit, inverter means connected to said source for providing an alternating current output, amplifier means having a control portion connected to be responsive to a control voltage applied thereto, said amplifier means being connected in circuit relation with said inverter means for providing an alternating output which varies with said control voltage, and rectifier means connected in circuit relation between said amplifier means and the load circuit for rectifying said alternating output and producing a unidirectional output which varies with said control voltage, the sum of said direct current source and said unidirectional output being applied to said load circuit.

9. In combination, a source of direct current for supplying to a load circuit a direct current voltage which tends to vary, inverter means connected to said source for providing an alternating current output, amplifier means having a control portion connected to be responsive to the voltage, said amplifier means being connected in circuit relation with said inverter means for providing an alternating output which varies with the voltage, and rectifying means connected in circuit relation with said amplifying means for providing a unidirectional output which varies inversely with said voltage, said load circuit being connected to be responsive to the sum of said unidirectional output and the direct current source.

10. In an electrical control circuit, the combination comprising, a source of direct current having a substantially constant voltage for supplying current to a load circuit, inverter means connected to said source for producing an alternating current output, amplifier means including a plurality of switching transistors having a control portion connected to be responsive to a control signal applied thereto, said plurality of switching transistors being connected in circuit relation with said inverter means for producing an alternating output which varies with said control signal, and rectifier means connected in circuit relation with said transistors and said load circuit for providing a unidirectional output which varies with said control signal, the sum of said unidirectional output and said direct current source being applied to said load circuit.

11. In an electrical control circuit, the combination comprising, a source of direct current having a substantially constant voltage for supplying current to a load circuit, inverter means connected to said source for producing an alternating current output, amplifier means having a control portion disposed to be responsive to a control signal applied thereto, said amplifier means being connected in circuit relation with said inverter means for providing an alternating current output which varies inversely with said control signal, and rectifier means connected in circuit relation between said amplifier means and said load circuit to be responsive to said alternating current output for providing a unidirectional output voltage which varies inversely with said control signal, the sum of said unidirectional output and the direct current source being applied to said load circuit.

12. In a regulator system for maintaining the voltage applied to a load circuit from a source of direct current at a predetermined value, the combination comprising free-running inverter means connected to said source for providing an alternating current output, amplifier means having a control portion connected to be responsive to the voltage, said amplifier means being connected in circuit relation with said inverter means for providing an alternating output which varies with the voltage, and rectifier means connected in circuit relation with said amplifier means for rectifying the alternating output from said amplifier means and providing a unidirectional output which varies inversely with said voltage, the voltage applied to said load being the sum of said unidirectional output and said direct current source.

13. In a regulator system for supplying to a load circuit a voltage which tends to vary from a source of direct current, the combination comprising inverter means including a pair of transistors and saturable core means connected in circuit relation with said source for producing an alternating current output, amplifier means having a control portion connected to be responsive to the voltage, said amplifier means being connected in circuit relation with said inverter means to provide an alternating output which carries inversely with said voltage, and rectifier means connected in circuit relation with said amplifier means and said load circuit for providing a unidirectional output which varies inversely with said voltage, the sum of said unidirectional output and said direct current source being applied to said load circuit.

14. In a regulator system for supplying to a load circuit a direct current voltage which tends to vary supplied from a source of direct current, the combination comprising inverter means connected to said source for producing an alternating current output, amplifier means having a control portion connected to be responsive to the voltage, said amplifier means including a plurality of switching transistors connected in circuit relation with said source for producing an alternating output which varies with said voltage, and rectifier means connected in circuit relation with said transistors and said load circuit for providing a unidirectional output which varies inversely with said voltage, the sum of said unidirectional output and the voltage of said source being applied to said load circuit.

15. Regulating apparatus for supplying to a load circuit a direct current voltage which tends to vary supplied from a source of direct current, the combination comprising inverter means connected to said source for producing an alternating current output, amplifier means having a control portion connected to be responsive to the voltage, said amplifier means being connected in circuit relation with said inverter means to provide an alternating output which varies inversely with said voltage, and rectifier means connected in circuit relation between said amplifier means and the load circuit to be responsive to said alternating output for providing a unidirectional output which varies inversely with said voltage, the sum of said unidirectional output and said direct current source being applied to said load circuit.

References Cited in the file of this patent

UNITED STATES PATENTS

| | | |
|---|---|---|
| 2,821,639 | Bright et al. | Jan. 28, 1958 |
| 2,832,034 | Lilienstein et al. | Apr. 22, 1958 |
| 2,836,782 | Mazur | May 27, 1958 |
| 2,855,554 | Conger et al. | Oct. 7, 1958 |